United States Patent
Kim et al.

(10) Patent No.: US 12,509,412 B2
(45) Date of Patent: Dec. 30, 2025

(54) POLYMERIZABLE RAW MATERIAL COMPRISING RECYCLED BIS(2-HYDROXYETHYL) TEREPHTHALATE AND METHOD FOR PREPARING THE SAME

(71) Applicant: SK CHEMICALS CO., LTD., Seongnam-si (KR)

(72) Inventors: Ji-Hun Kim, Seongnam-si (KR); Kwang-Woo Park, Seongnam-si (KR); Seong-Ki Lee, Seongnam-si (KR); Joong Ki Lee, Seongnam-si (KR); Yuntae Jin, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 0 days.

(21) Appl. No.: 18/687,102

(22) PCT Filed: Sep. 25, 2023

(86) PCT No.: PCT/KR2023/014681
§ 371 (c)(1),
(2) Date: Feb. 27, 2024

(87) PCT Pub. No.: WO2024/071915
PCT Pub. Date: Apr. 4, 2024

(65) Prior Publication Data
US 2024/0343672 A1    Oct. 17, 2024

(30) Foreign Application Priority Data
Sep. 30, 2022   (KR) ......................... 10-2022-0125338

(51) Int. Cl.
*C07C 67/54*    (2006.01)
*C08J 11/24*    (2006.01)

(52) U.S. Cl.
CPC ............... *C07C 67/54* (2013.01); *C08J 11/24* (2013.01); *C08J 2367/03* (2013.01)

(58) Field of Classification Search
CPC ......... C07C 67/03; C07C 67/52; C07C 67/54; C07C 69/82; C08G 63/183; C08J 11/24; C08J 2367/02; C08J 2367/03; Y02W 30/62; Y02W 90/10
See application file for complete search history.

(56) References Cited

U.S. PATENT DOCUMENTS

| | | | | |
|---|---|---|---|---|
| 12,018,118 B2 * | 6/2024 | Hwang | ................. | B29C 48/022 |
| 2006/0074136 A1 * | 4/2006 | Smith | ..................... | C08J 11/24 521/48 |
| 2021/0024717 A1 * | 1/2021 | Fang | ........................ | C08J 11/16 |
| 2024/0002588 A1 | 1/2024 | Hwang et al. | | |
| 2024/0158568 A1 * | 5/2024 | Hwang | ...................... | C08J 5/18 |

FOREIGN PATENT DOCUMENTS

| | | | |
|---|---|---|---|
| EP | 4361195 | * | 5/2024 |
| EP | 4414407 | * | 8/2024 |
| JP | 2003-055300 A | | 2/2003 |
| JP | 2005-330444 A | | 12/2005 |
| JP | 2006-232701 A | | 9/2006 |
| JP | 2006143622 | * | 6/2008 |
| KR | 10-2021-0067554 A | | 6/2021 |
| KR | 10-2021-0067555 A | | 6/2021 |
| KR | 10-2022-0064077 A | | 5/2022 |
| KR | 10-2022-0068991 A | | 5/2022 |
| KR | 10-2577296 B1 | | 9/2023 |
| KR | 102576746 | * | 9/2023 |
| TW | 202208530 A | | 3/2022 |
| WO | 2021/028695 A1 | | 2/2021 |
| WO | WO2021028695 | * | 2/2021 |
| WO | 2022/171874 A1 | | 8/2022 |
| WO | WO2023163481 | * | 8/2023 |
| WO | WO2023219335 | * | 11/2023 |
| WO | WO2023249327 | * | 12/2023 |

OTHER PUBLICATIONS

WO2023163481 translation (Year: 2023).*
WO2023219335 translation (Year: 2023).*
WO2023249327 translation (Year: 2023).*
JP2006143622 translation (Year: 2008).*
Extended European Search Report dated Nov. 20, 2024 in Application No. 23848774.8.
Korean Intellectual Office Notice of Preliminary Rejection for 10-2022-0125338 dated Jan. 5, 2023.
Korean Intellectual Office Notice of Final Rejection for 10-2022-0125338 dated Mar. 16, 2023.
Korean Intellectual Office Communication for KR Application No. 10-2022-0125338 dated Jun. 7, 2023.
International Search Report for PCT/KR2023/014681 dated Jan. 9, 2024 (PCT/ISA/210).

* cited by examiner

*Primary Examiner* — Andrew D Kosar
*Assistant Examiner* — Blaine G Doletski
(74) *Attorney, Agent, or Firm* — Sughrue Mion, PLLC

(57) ABSTRACT

A polymerization raw material obtained by the depolymerization of waste polyester is disclosed. The polymerization raw material contains recycled bis(2-hydroxyethyl) terephthalate in which the contents of acetate-based ester compounds and diethylene glycol ester compounds are adjusted to specific levels. The polymerization raw material is excellent in purity and quality, and free from the problem that thermal resistance characteristics deteriorate in the polymerization of a polymer from the recycled monomer.

9 Claims, No Drawings

POLYMERIZABLE RAW MATERIAL COMPRISING RECYCLED BIS(2-HYDROXYETHYL) TEREPHTHALATE AND METHOD FOR PREPARING THE SAME

CROSS REFERENCE TO RELATED APPLICATIONS

This application is a National Stage of International Application No. PCT/KR2023/014681 filed Sep. 25, 2023, claiming priority based on Korean Patent Application No. 10-2022-0125338 filed Sep. 30, 2022.

TECHNICAL FIELD

The present invention relates to a polymerization raw material comprising bis(2-hydroxyethyl) terephthalate (BHET) recycled from waste polyester and to a process for preparing the same.

BACKGROUND ART

Polyester is widely used as a material for beverage-filling containers, packaging films, audio and video films, and the like by virtue of its excellent mechanical strength, thermal resistance, transparency, and gas barrier properties. In addition, polyester is widely produced worldwide as an industrial material such as medical fibers and tire cords. In particular, polyester sheets or plates have good transparency and excellent mechanical strength, so that they are widely used as raw materials for cases, boxes, partitions, shelves, panels, packaging materials, building materials, interior and exterior materials, and the like.

As a result, waste of plastics such as polyester is generated globally at an unmanageable level every year. Recently, countries around the world have prepared regulations and plans for recycling waste plastic resources, including waste polyester. Although physical or chemical methods are used as methods of recycling waste polyester, physical recycling methods cannot guarantee purity and, thus, are not widely used.

Meanwhile, in chemical recycling methods, the ester bond of waste polyester is severed to depolymerize it. Specifically, reactions such as glycolysis, hydrolysis, methanolysis, and aminolysis are used. Glycolysis among them is to decompose waste polyester by adding a glycol such as ethylene glycol or diethylene glycol at high temperatures. A reaction product comprising mainly bis(2-hydroxyethyl) terephthalate (BHET) is obtained. The bis(2-hydroxyethyl) terephthalate contained in the reaction product may be used as a raw material for preparing unsaturated polyester or ester polyol after the crystallization or purification thereof.

In order to use bis(2-hydroxyethyl) terephthalate as the above raw material, however, it is necessary to increase the purity of bis(2-hydroxyethyl) terephthalate by minimizing the formation of by-products such as diethylene glycol esters during the depolymerization process.

PRIOR ART DOCUMENT (Patent Document 1) Korean Laid-open Patent Publication No. 2022-0068991

DISCLOSURE OF INVENTION

Technical Problem

In general, bis(2-hydroxyethyl) terephthalate, recycled through depolymerization of a waste polyester resin, contains oligomeric substances such as dimers and trimers, along with by-products derived from diethylene glycol (DEG) formed at high depolymerization temperatures, which serve as a factor to impair the quality of a product. In addition, an acetate, which is mainly used as a catalyst in a glycolysis reaction, has a boiling point similar to that of ethylene glycol, which is mainly used as a solvent; thus, it as an impurity is not easily filtered out during the recovery and reuse of ethylene glycol. As a result, as the process is repeated, it accumulates and forms by-products.

In particular, the present inventors have paid attention to the fact that acetate-based ester compounds and diethylene glycol ester compounds among these by-products impair the purity and quality of recycled bis(2-hydroxyethyl) terephthalate, thereby impairing the degree of polymerization and thermal resistance characteristics in the preparation of polymers therefrom. In order to solve the problem, the present inventors have been able to control the contents of acetate-based ester compounds and diethylene glycol ester compounds in the final product to a specific level by removing these organic substances of low weight during the purification process. As a result, it is possible to prevent thermal resistance characteristics from deteriorating in the preparation of polymers.

Accordingly, an object of the present invention is to provide a polymerization raw material comprising recycled bis(2-hydroxyethyl) terephthalate that does not deteriorate thermal resistance in the preparation of polymers and a process for preparing the same.

Solution to Problem

According to an aspect of the present invention, there is provided a polymerization raw material that is obtained by the depolymerization of waste polyester, wherein the peak area fraction of acetate-based ester compounds is 1.0% or less in total, and the peak area fraction of diethylene glycol ester compounds is 2.0% or less in total, when measured by high-performance liquid chromatography (HPLC).

According to an embodiment of the present invention, there is provided a polymerization raw material that is obtained by the depolymerization of waste polyester, wherein the peak area fraction of bis(2-hydroxyethyl) terephthalate is 95% or more, the peak area fraction of acetate-based ester compounds is 0.001% to 1.0% in total, and the peak area fraction of diethylene glycol ester compounds is 0.001% to 2.0% in total, when measured by high-performance liquid chromatography (HPLC).

According to another aspect of the present invention, there is provided a process for preparing a polymerization raw material that comprises (a) depolymerizing waste polyester by glycolysis to obtain a crude bis(2-hydroxyethyl) terephthalate solution; (b) cooling the crude bis(2-hydroxyethyl) terephthalate solution to crystallize it; and (c) separating the crystallized product into solid and liquid using a pressurized filter.

Advantageous Effects of Invention

In the present invention, the contents of acetate-based ester compounds and diethylene glycol ester compounds in a polymerization raw material that comprises recycled bis (2-hydroxyethyl) terephthalate are adjusted to specific levels. Thus, it is possible to prevent thermal resistance characteristics from deteriorating by these compounds in the polymerization of a recycled polyester resin.

In order to prepare such a polymerization raw material comprising recycled bis(2-hydroxyethyl) terephthalate, organic substances of low weight, including acetic acid, are removed through cooling crystallization and pressure filtering during the purification process, so that the content of by-products such as acetate-based ester compounds or diethylene glycol ester compounds can be effectively controlled.

Accordingly, not only can the present invention depolymerize waste polyester for preparing a polymerization raw material, but polyester resins and products of excellent quality such as thermal resistance characteristics can be also produced using the same as a raw material.

BEST MODE FOR CARRYING OUT THE INVENTION

In this specification, terms referring to the respective components are used to distinguish them from each other and are not intended to limit the scope of the embodiment. In addition, in the present specification, a singular expression is interpreted to cover a plural number as well unless otherwise specified in the context.

In the present specification, the terms first, second, and the like are used to describe various components. But the components should not be limited by the terms. The terms are used for the purpose of distinguishing one element from another.

In the present specification, the term "comprising" is intended to specify a particular characteristic, region, step, process, element, and/or component. It does not exclude the presence or addition of any other characteristic, region, step, process, element and/or component, unless specifically stated to the contrary.

In the numerical range that limits the content of components, physical properties, and the like described in the present specification, when a numerical range limited with the upper limit only and a numerical range limited with the lower limit only are separately exemplified, it should be understood that a numerical range combining these upper and lower limits is also encompassed in the exemplary scope of the invention.

The molecular weight of a compound or polymer described in the present specification, for example, a number average molecular weight or a weight average molecular weight, is a relative mass based on carbon-12 as is well known. Although its unit is not described, it may be understood as a molar mass (g/mole) of the same numerical value, if necessary.

The polymerization raw material of the present invention that comprises recycled bis(2-hydroxyethyl) terephthalate is obtained by the depolymerization of waste polyester, wherein the peak area fraction of acetate-based ester compounds is 1.0% or less in total, and the peak area fraction of diethylene glycol ester compounds is 2.0% or less in total, when measured by high-performance liquid chromatography (HPLC).

The polymerization raw material according to an embodiment is obtained by the depolymerization of waste polyester, wherein the peak area fraction of bis(2-hydroxyethyl) terephthalate is 95% or more, the peak area fraction of acetate-based ester compounds is 0.001% to 1.0% in total, and the peak area fraction of diethylene glycol ester compounds is 0.001% to 2.0% in total, when measured by high-performance liquid chromatography (HPLC).

As the contents of acetate-based ester compounds and diethylene glycol ester compounds in the polymerization raw material are adjusted to specific levels, it is possible to prevent thermal resistance characteristics from deteriorating by these compounds in the polymerization of a recycled polyester resin.

Hereinafter, the polymerization raw material according to the present invention will be described in detail.

Polymerization Raw Material Comprising Recycled Bis(2-Hydroxyethyl) Terephthalate Bis(2-hydroxyethyl) terephthalate (BHET) is an ester of two ethylene glycols and one terephthalic acid. For example, it is a compound formed as an intermediate in the process of preparing a polyester such as polyethylene terephthalate (PET) through the polymerization of ethylene glycol and terephthalic acid or its ester.

Meanwhile, the polymerization raw material comprising recycled bis(2-hydroxyethyl) terephthalate (recycled BHET) obtained by the depolymerization of waste polyester may contain reagents or solvents used in various chemical steps during the depolymerization of waste polyester, or by-products formed by side reactions with them. Thus, the polymerization raw material comprising recycled bis(2-hydroxyethyl) terephthalate obtained by the depolymerization of waste polyester as described above may be viewed as a type of composition comprising two or more components. Thus, in the present invention, the polymerization raw material comprising recycled BHET may be referred to as "recycled BHET composition" or "polymerization raw material composition."

The polymerization raw material comprising BHET recycled by a common depolymerization process contains organic and inorganic impurities in addition to BHET as the main component; thus, its purity is not high. However, the polymerization raw material comprising recycled bis(2-hydroxyethyl) terephthalate according to the present invention has excellent purity and quality although it is obtained by the depolymerization of waste polyester.

The purity of the polymerization raw material comprising recycled BHET may be measured using liquid chromatography or the like. Specifically, the purity of the polymerization raw material comprising recycled BHET may be calculated by measuring the fraction (%) of the peak area of BHET out of the total peak area in a spectrum obtained using high-performance liquid chromatography (HPLC).

The polymerization raw material may have a peak area fraction of bis(2-hydroxyethyl) terephthalate of 95% or more when measured by high-performance liquid chromatography (HPLC). For example, the peak area fraction of bis(2-hydroxyethyl) terephthalate may be 95% or more, 97% or more, 98% or more, 99% or more, or 99.5% or more, and may be 99.998% or less, 99.99% or less, 99.9% or less, or 99% or less, specifically, 95% to 99.998% or 97% to 99.998%. According to an embodiment, the polymerization raw material may have a peak area fraction of bis(2-hydroxyethyl) terephthalate of 95% to 99.998%, specifically, 97% to 99.998%, 98% to 99.998%, 99% to 99.998%, or 99.5% to 99.998%, when measured by high-performance liquid chromatography (HPLC).

Meanwhile, the polymerization raw material may comprise a compound other than BHET, specifically, BHET analogues, BHET oligomers (e.g., dimers, trimers), esters, and acetate-based compounds.

Specifically, the polymerization raw material may have a peak area fraction of oligomers such as dimers or higher of 2.0% or less in total when measured by high-performance liquid chromatography (HPLC). More specifically, the peak area fraction of oligomers such as dimers or higher may be 1.5% or less, 1.0% or less, or 0.5% or less, in total. Meanwhile, the lower limit of the peak area fraction of oligomers such as dimers or higher may be 0% or more, 0.001% or more, 0.01% or more, or 0.1% or more, in total.

In general, a polymerization raw material, recycled through depolymerization of a waste polyester resin, contains oligomeric substances such as dimers and trimers, along with by-products derived from diethylene glycol (DEG) formed at high depolymerization temperatures, which serve as a factor to impair the quality of a product.

In addition, an acetate (e.g., zinc acetate), which is mainly used as a catalyst in a glycolysis reaction, reacts with ethylene glycol during the depolymerization reaction to be converted to hydroxyethyl acetate (HA). HA has a boiling point similar to that of ethylene glycol, which is mainly used as a solvent; thus, it as an impurity is not easily filtered out during the recovery and reuse of ethylene glycol. As a result, as the process is repeated, it accumulates to form by-products.

As shown in the following Reaction Scheme 1, acetic acid (AA) derived from metal acetate, which is mainly used as a catalyst, may react with ethylene glycol (EG) to produce an acetate-based compound such as 2-hydroxyethyl acetate (HA) and water (H₂O).

[Reaction Scheme 1]

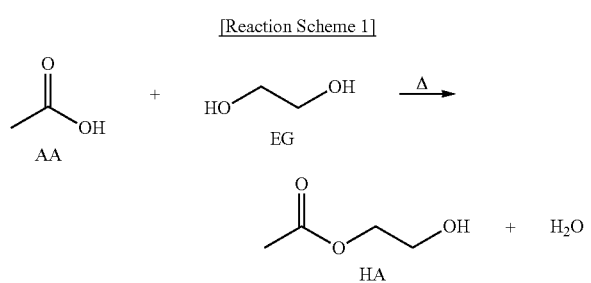

In addition, as shown in the following Reaction Scheme 2, 2-hydroxyethyl acetate (HA) may be converted to ester compounds such as 2-hydroxyethyl(2-acetoxyethyl) terephthalate (HAET) and ethylene glycol (EG) through a trans-esterification reaction with bis(2-hydroxyethyl) terephthalate (BHET).

[Reaction Scheme 2]

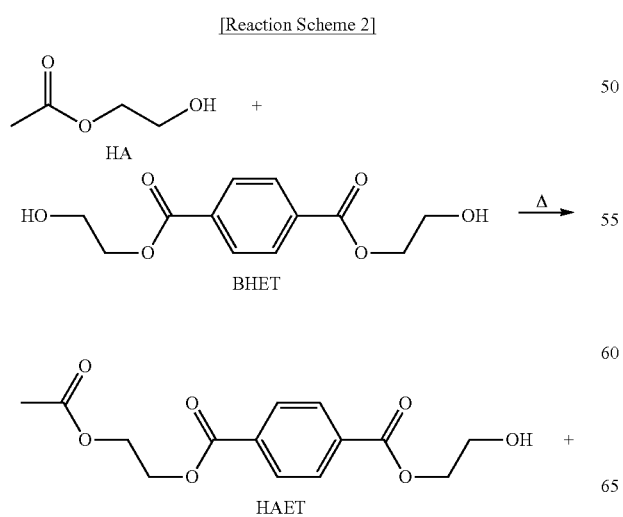

-continued

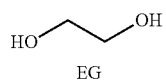

The polymerization raw material according to an embodiment has a peak area fraction of acetate-based ester compounds of 1.0% or less in total when measured by high-performance liquid chromatography (HPLC). Specifically, the polymerization raw material may have a peak area fraction of acetate-based ester compounds of 0.7% or less, 0.5% or less, 0.3% or less, or 0.2% or less, in total, when measured by high-performance liquid chromatography (HPLC). Meanwhile, the lower limit of the peak area fraction of acetate-based ester compounds may be 0.001% or more, 0.01% or more, or 0.1% or more, in total. According to an embodiment, the polymerization raw material may have a peak area fraction of acetate-based ester compounds of 0.001% to 1.0%, specifically, 0.001% to 0.7%, 0.001% to 0.5%, 0.001% to 0.3%, or 0.001% to 0.2%, in total, when measured by high-performance liquid chromatography (HPLC). The acetate-based ester compound may be a 2-hydroxyethyl acetate ester compound. Specifically, it may comprise at least one selected from the group consisting of 2-hydroxyethyl(2-acetoxyethyl) terephthalate (HAET), 2-acetoxyethyl[2-(2-hydroxyethoxy)ethyl] terephthalate, and 2-hydroxyethyl[2-[2-(2-hydroxyethoxy)ethoxy]ethyl] terephthalate. As a more specific example, the acetate-based ester compounds may comprise 2-hydroxyethyl(2-acetoxyethyl) terephthalate.

In addition, the polymerization raw material has a peak area fraction of diethylene glycol (DEG) ester compounds of 2.0% or less in total when measured by high-performance liquid chromatography (HPLC). For example, the peak area fraction of diethylene glycol (DEG) ester compounds may be 1.5% or less, 1% or less, or 0.5% or less, in total. Meanwhile, the lower limit of the peak area fraction of diethylene glycol (DEG) ester compounds may be 0.001% or more, 0.01% or more, or 0.1% or more, in total. According to an embodiment, the polymerization raw material may have a peak area fraction of diethylene glycol (DEG) ester compounds of 0.001% to 2.0%, specifically, 0.001% to 1.5%, 0.001% to 1%, or 0.001% to 0.5%, in total, when measured by high-performance liquid chromatography (HPLC). The diethylene glycol ester compound may comprise 2-hydroxyethyl[2-(2-hydroxyethoxy)ethyl] terephthalate and bis[2-(2-hydroxyethoxy)ethyl]benzene-1,4-dicarboxylate. These are represented by the following Formulae 1 and 2, respectively.

[Formula 1]

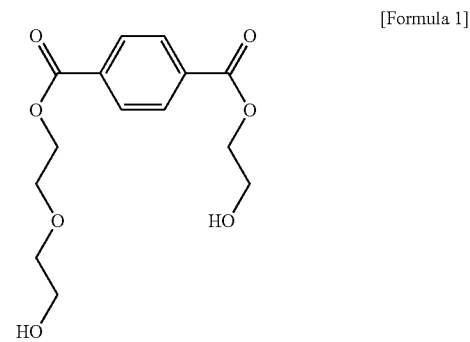

[Formula 2]

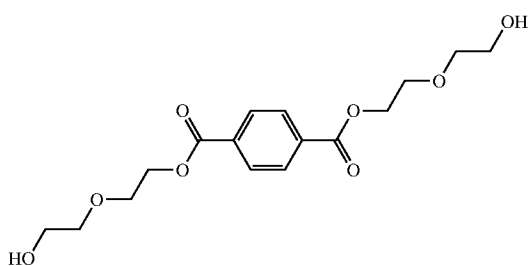

As the contents of acetate-based ester compounds and diethylene glycol ester compounds in the polymerization raw material are adjusted to specific levels in the present invention, it is possible to prevent thermal resistance characteristics from deteriorating by these compounds in the polymerization of a recycled polyester resin.

As the content of diethylene glycol ester compounds in the polymerization raw material increases, the thermal resistance properties such as melting point of a final polymer resin linearly decrease. Acetate-based ester compounds act as a terminator that inhibits the growth of polymer chains. As its content increases, the thermal resistance properties of a final polymer resin decrease exponentially. An equation for predicting the thermal resistance properties of a polymer resin prepared from the polymerization raw materials can be derived using these relationships.

For example, the polymerization raw material may have a thermal property drop index (TDI) of 6.0 or less, 5.0 or less, 4.0 or less, or 3.0 or less, as defined by the following equation, when measured by high-performance liquid chromatography (HPLC).

$$TDI = [DEG-ester-1] + [DEG-ester-2] \times 2 + \exp\char`\^[HA-ester]$$

Here, DEG-ester-1 is the peak area fraction (%) of 2-hydroxyethyl[2-(2-hydroxyethoxy)ethyl] terephthalate, DEG-ester-2 is the peak area fraction (%) of bis[2-(2-hydroxyethoxy)ethyl]benzene-1,4-dicarboxylate, and HA-ester is the peak area fraction (%) of 2-hydroxyethyl(2-acetoxyethyl) terephthalate. It is calculated by taking only the numerical values excluding the units of these parameters.

Specifically, if the thermal property drop index (TDI) defined by the above equation is 3.0 or less, it is possible to more effectively prevent the thermal resistance properties from deteriorating by these compounds in the polymerization of a recycled polyester resin. More specifically, the thermal property drop index (TDI) may be 2.5 or less or 2.0 or less. Alternatively, the thermal property drop index (TDI) may be 0 to 3.0, 0 to 2.5, 0.5 to 3.0, 1.0 to 3.0, or 0.5 to 2.5.

In addition, the polymerization raw material may have a peak area fraction of monohydroxyethyl terephthalate (MHET) of 2% or less, 1.5% or less, 1% or less, or 0.5% or less, when measured by high-performance liquid chromatography (HPLC).

The polymerization raw material of the present invention has excellent crystallinity, thereby having a high melting point, and has excellent quality such as color.

For example, the polymerization raw material may have a melting point (m.p.) of 100° C. or higher, 105° C. or higher, or 110° C. or higher, and 125° C. or lower, 120° C. or lower, or 115° C. or lower. As a specific example, the polymerization raw material may have a melting point of 110° C. to 115° C.

The polymerization raw material may have a yellow index (YID) of 5.0 or less when measured for a solution dissolved in dimethylformamide at a concentration of 25% by weight. Specifically, the yellow index may be 5.0 or less, 4.5 or less, 4.0 or less, 3.5 or less, 3.0 or less, 2.5 or less, 2.0 or less, 1.5 or less, or 1.0 or less.

In addition, the total content of residual ethylene glycol in the polymerization raw material may be 1% by weight or less, 0.9% by weight or less, 0.5% by weight or less, or 0.3% by weight or less, based on a weight ratio detected by gas chromatography analysis. More specifically, the content of residual ethylene glycol in the polymerization raw material may be 0.5% by weight or less. More specifically, the content of residual ethylene glycol in the polymerization raw material may be 0.2% by weight or less, 0.15% by weight or less, or 0.1% by weight or less.

The process for preparing a polymerization raw material according to the present invention comprises (a) depolymerizing waste polyester by glycolysis to obtain a crude bis(2-hydroxyethyl) terephthalate solution; (b) cooling the crude bis(2-hydroxyethyl) terephthalate solution to crystallize it; and (c) separating the crystallized product into solid and liquid using a pressurized filter.

As organic substances of low weight, including acetic acid, are removed through cooling crystallization and pressure filtering during the purification process, the content of by-products such as acetate-based ester compounds or diethylene glycol ester compounds can be effectively controlled.

Hereinafter, each step of the process for preparing a polymerization raw material according to the present invention will be described in detail.

Depolymerization of Waste Polyester

First, waste polyester is depolymerized by glycolysis to obtain a crude bis(2-hydroxyethyl) terephthalate solution.

The waste polyester raw material may be obtained from a polyester material product discarded after use. Specifically, the waste polyester may be obtained by pretreating waste products such as beverage bottles, fabrics, films, cases, boxes, partitions, shelves, protective panels, packaging materials, building materials, and interior and exterior materials, which comprise various polyester materials (e.g., polyethylene terephthalate (PET) material) discarded after having been used by consumers.

The pretreatment may be carried out by removing other plastics, metals, and foreign substances mixed in the waste, washing it, and then crushing it through a crusher. As a result of the pretreatment, the waste polyester raw material may have a flake form. In addition, the waste polyester raw material may have a fine structure like a fiber.

The waste polyester pretreated in this way is then subjected to a depolymerization process. The depolymerization process may comprise, for example, a glycolysis reaction. As is well known, the glycolysis reaction refers to a chemical reaction in which a polymer chain or the like is severed by a glycol such as ethylene glycol. The total weight of the glycol added may be 1, 2, or 3 times the weight of the waste polyester resin or more and may be 7, 5, or 4 times or less. For example, the weight of the glycol added may be 1 to 7 times, specifically, 2 to 5 times, more specifically, 3 to 4 times, relative to the weight of the waste polyester resin.

A catalyst may be used in the glycolysis reaction. The catalyst may be a metal catalyst, for example, a metal salt catalyst or a metallic organic catalyst. Specifically, the catalyst may be an acetate, carbonate, oxide, or hydroxide of a metal, and the metal may be an alkali metal, an alkali earth metal, or a transition metal. As a specific example, the catalyst comprises a metal acetate, or an anhydride or a hydride thereof. More specifically, it may be at least one selected from the group consisting of zinc acetate, sodium acetate, cobalt acetate, and manganese acetate, or in the form of a hydrate or anhydride thereof. In addition, the weight of the catalyst added may be 0.01 part by weight or more, 0.1 part by weight or more, 0.2 part by weight or more, or 0.3 part by weight or more, and may be 5 parts by weight or less, 1 part by weight or less, 0.7 part by weight or less, 0.5 part by weight or less, or 0.4 part by weight or less, relative to 100 parts by weight of the waste polyester resin. For example, the weight of the catalyst added may be 0.1 part by weight to 1 part by weight, specifically, 0.2 part by weight to 0.7 part by weight, relative to 100 parts by weight of the waste polyester resin. More specifically, the catalyst may be used in an amount of 0.2 part by weight to 0.4 part by weight relative to 100 parts by weight of the waste polyester.

As a specific example, the glycolysis in step (a) may comprise a reaction of waste polyester and ethylene glycol in the presence of an acetate-based catalyst.

The depolymerization may comprise, for example, a multi-stage depolymerization reaction at low temperatures. According to an embodiment, the depolymerization comprises subjecting waste polyester to depolymerization through a first glycolysis reaction at a high temperature; and subjecting the product to depolymerization at a low temperature through a second glycolysis reaction.

The temperature during the first glycolysis reaction may be 170° C. or higher, 180° C. or higher, or 190° C. or higher, and may be 205° C. or lower, 200° C. or lower, 195° C. or lower, or 190° C. or lower. For example, the temperature during the first glycolysis reaction may be 180° C. to 200° C., specifically, 180° C. to 195° C., more specifically, 180° C. to 190° C.

In addition, the temperature during the second glycolysis reaction may be 140° C. or higher, 150° C. or higher, or 160° C. or higher, and may be 170° C. or lower or 160° C. or lower. For example, the temperature during the second glycolysis reaction may be 150° C. to 170° C., specifically, 150° C. to 160° C., more specifically, 150° C. to 155° C.

As a specific example, the depolymerization may comprise (1) subjecting waste polyester to depolymerization through a first glycolysis reaction at a temperature of 180 to 200° C. to obtain a first reactant; and (2) subjecting the first reactant to depolymerization at a temperature of 150 to 170° C. through a second glycolysis reaction to obtain a second reactant.

The period of time required for the first and second glycolysis reactions may be 1 hour or more or 2 hours or more, and may be 4 hours or less or 3 hours or less, from the point when the appropriate temperature is reached. For example, the period of time required for the first and second glycolysis reactions may be 1 hour to 4 hours, specifically, 1 hour to 3 hours, more specifically, 1 hour to 2 hours, from the point when the appropriate temperature is reached.

As a more specific example, the first glycolysis reaction may be carried out at a temperature of 180° C. to 190° C. for 1 hour to 3 hours. In addition, the second glycolysis reaction may be carried out at a temperature of 150° C. to 160° C. for 1 hour to 3 hours.

As an example, the first glycolysis reaction may be carried out in the presence of a zinc acetate anhydride catalyst. As a specific example, the first glycolysis reaction may be carried out at a temperature of 180° C. to 200° C. for 1 hour to 3 hours in the presence of a zinc acetate anhydride catalyst. The zinc acetate anhydride may be used in an amount of 0.2 part by weight to 0.4 part by weight relative to 100 parts by weight of the waste polyester. In addition, the second glycolysis reaction may be carried out at a temperature of 140° C. to 160° C. for 1 hour to 3 hours upon the further addition of ethylene glycol without an additional catalyst.

Cooling and Filtration

The crude bis(2-hydroxyethyl) terephthalate solution obtained by depolymerization may then be cooled. The cooling temperature may be, for example, 150° C. or lower, 140° C. or lower, 130° C. or lower, 120° C. or lower, 110° C. or lower, 100° C. or lower, and may be 50° C. or higher, 60° C. or higher, 70° C. or higher, 80° C. or higher, or 90° C. or higher.

As an example, the cooling may be carried out through a reduced-pressure flash process. Specifically, the temperature of the crude bis(2-hydroxyethyl) terephthalate solution may be lowered by evaporating ethylene glycol by applying a vacuum through the reduced-pressure flash process. For example, the crude bis(2-hydroxyethyl) terephthalate solution may be further subjected to a step of cooling to 120° C. or lower through reduced pressure flash prior to subsequent steps. More specifically, the temperature of the crude bis(2-hydroxyethyl) terephthalate solution may be lowered to 110° C. or lower or 100° C. or lower by the reduced-pressure flash process. The pressure condition of the reduced-pressure flash process may be, for example, 200 Torr or less, 100 Torr or less, or 50 Torr or less, specifically, 10 Torr to 200 Torr, 10 Torr to 100 Torr, or 10 Torr to 50 Torr.

Thereafter, insoluble foreign substances may be removed from the cooled crude bis(2-hydroxyethyl) terephthalate solution through filtration. As a specific example, a step of cooling the crude bis(2-hydroxyethyl) terephthalate solution to 120° C. or lower and filtering it with the addition of a filter aid may be further carried out. As a result, fine particles and insoluble organic substances present in the crude bis(2-hydroxyethyl) terephthalate solution can be filtered out by solid-liquid separation.

Known ingredients such as diatomaceous earth, perlite, and asbestos powder may be used as the filter aid. For example, 0.1 part by weight to 2.0 parts by weight of the filter aid may be added to 100 parts by weight of the crude bis(2-hydroxyethyl) terephthalate solution.

Since bis(2-hydroxyethyl) terephthalate (BHET) or oligomers obtained through the depolymerization reaction are present in a solid form at room temperature, it is difficult to separate foreign substances at room temperature. Thus, it is preferable to separate them at a temperature condition of 90° C. to 150° C., more specifically, 110° C. to 150° C. In addition, if the above temperature range is maintained, the removal of insoluble foreign substances may be facilitated thanks to good flowability.

Various methods and devices may be used in the removal of insoluble foreign substances through solid-liquid separation. For example, a device such as a pressurized filter, a centrifugal separator, a filter press, a belt press, or the like may be used. But it is not limited thereto as long as any method capable of separating foreign substances is used.

According to an embodiment, as the crude bis(2-hydroxyethyl) terephthalate solution is subjected to a solid-liquid separation step by filtering out the low-weight organic substances contained therein, most acetate-based ester compounds and diethylene glycol ester compounds can be discharged in a liquid form.

The process according to an embodiment comprises cooling the crude bis(2-hydroxyethyl) terephthalate solution to crystallize it; and separating the crystallized product into solid and liquid using a pressurized filter.

The temperature for cooling crystallization may be, for example, 70° C. or lower, 60° C. or lower, 50° C. or lower, 40° C. or lower, 30° C. or lower, or 25° C. or lower, and may be 0° C. or higher, 5° C. or higher, 10° C. or higher, 5° C. or higher, or 20° C. or higher. As a specific example, it may be room temperature.

Acetate-based compounds and diethylene glycol-based compounds may be removed through the cooling crystallization.

The operating pressure of the pressurized filter may be 0.1 bar to 21 bar, more specifically 1 bar to 5 bar. In addition, the operating temperature of the pressurized filter may be 5° C. to 35° C., more specifically 15° C. to 25° C.

The pressurized filter may be a Nutsche filter or a filter press.

Before use of the Nutsche filter, it is desirable to inactivate the inside of the container by nitrogen purging or the like. First, a mixture is put into a Nutsche filter, and an inert gas such as nitrogen is injected and pressurized to separate the solvent and the filter cake. Thereafter, water is injected into the Nutsche filter to wash out the residual solvent remaining in the filter cake, and inert gas is injected and pressurized to separate the filter cake and water. The obtained filter cake may be dried and cooled.

The filter press is a device that creates a filtration chamber with a filter plate having a filter surface, a filter cloth, and a cover, and separates solid and liquid by pressurizing the reactant between the filter cloth and the cover at a high pressure. Since a filter press increases the pressure difference before and after the filter medium as the solid-liquid separation surface as compared with a vacuum filter, more effective solid-liquid separation is possible.

Acetate-based compounds and diethylene glycol-based compounds may be removed through the pressurized filter.

Ion Exchange

In addition, the crude bis(2-hydroxyethyl) terephthalate solution may be further subjected to ion exchange through an ion exchange resin. As it is subjected to the ion exchange, ionic impurities present in the crude bis(2-hydroxyethyl) terephthalate solution, specifically, catalysts and foreign substances, may be removed.

As is well known, an ion-exchange resin refers to a resin or polymer that serves as a medium for ion exchange. The ion-exchange resin may comprise a cation-exchange resin, an anion-exchange resin, an amphoteric ion-exchange resin, a chelate resin, or the like.

The cation-exchange resin may comprise a strongly acidic cation-exchange resin having a sulfonic acid group ($-SO_3H$) and a weakly acidic cation-exchange resin having a carboxyl group (—COOH). The anion-exchange resin may comprise a strongly basic anion-exchange resin in the form of a quaternary ammonium salt and a weakly basic anion-exchange resin having a primary to tertiary amino group.

As a specific example, the ion-exchange resin may comprise at least one selected from the group consisting of a strongly acidic cation-exchange resin, a weakly acidic cation-exchange resin, and a chelate resin.

According to an embodiment, the ion exchange is carried out by adding an ion-exchange resin to the crude bis(2-hydroxyethyl) terephthalate solution.

The weight of the ion-exchange resin added may be 1, 3, or 5 times the weight of the catalyst added in the depolymerization reaction or more, and may be 20, 15, 10, or 8 times or less. For example, the weight of the ion-exchange resin added may be 1 to 20 times, specifically, 3 to 15 times, more specifically, 5 to 8 times, relative to the weight of the catalyst added in the depolymerization reaction.

In addition, the weight of the ion-exchange resin added may be 1 part by weight or more, 3 parts by weight or more, or 5 parts by weight or more, and may be 50 parts by weight or less, 20 parts by weight or less, 15 parts by weight or less, 10 parts by weight or less, or 7 parts by weight or less, relative to 100 parts by weight of the waste polyester resin employed in the depolymerization reaction.

As a specific example, the ion-exchange resin may be used in an amount of 1 part by weight to 20 parts by weight relative to 100 parts by weight of the waste polyester.

According to another embodiment, the ion exchange is carried out by using a column containing an ion-exchange resin.

Specifically, the column may be filled with particles of an ion-exchange resin, and ion exchange may be carried out while the crude bis(2-hydroxyethyl) terephthalate solution passes through the column.

The particle diameter of the ion-exchange resin particles may be, for example, 0.3 mm to 1.5 mm, more specifically, 0.6 mm to 0.9 mm.

The temperature for ion exchange may be, for example, 140° C. or lower, 130° C. or lower, 120° C. or lower, 110° C. or lower, 100° C. or lower, and may be 50° C. or higher, 60° C. or higher, 70° C. or higher, 80° C. or higher, or 90° C. or higher.

Further Purification Step

The polymerization raw material comprising recycled bis(2-hydroxyethyl) terephthalate as described above may be further subjected to a purification step as needed. According to an example, the polymerization raw material comprising recycled bis(2-hydroxyethyl) terephthalate may be prepared by further carrying out a step of removing an unreacted glycol by distillation.

Since an unreacted glycol still remains in the depolymerization product after filtration thereof in the previous step, it is necessary to remove the same from the product prior to the next step.

In addition, it is necessary to perform a step of recovering an unreacted glycol for an economical depolymerization process. That is, it is possible to recover and reuse a glycol, among glycols such as ethylene glycol, propylene glycol, diethylene glycol, or the like previously employed in the depolymerization, that remains without participating in the glycolysis reaction.

The distillation to remove the unreacted glycol may be carried out by, for example, vacuum distillation. A glass distillation apparatus or a rotary evaporator may be used for this purpose.

As the vacuum distillation to remove the unreacted glycol is carried out at a temperature of 150° C. or lower, the purity of BHET can be enhanced by further reducing the formation of diethylene glycol and impurities derived therefrom. For example, the vacuum distillation to remove the unreacted glycol may be carried out at a temperature of 150° C. lower, 130° C. lower, or 120° C. lower, and 80° C. higher, 90° C. higher, 100° C. higher, or 110° C. higher. Specifically, the temperature during the distillation to remove the unreacted glycol may be 80° C. to 190° C. or 90° C. to 150° C. As a more specific example, the distillation to remove the unreacted glycol may be carried out at a temperature of 100° C. to 130° C.

The pressure during the vacuum distillation to remove the unreacted glycol may be, for example, 0.1 Torr to 760 Torr, 0.1 Torr to 200 Torr, or 0.5 Torr to 30 Torr. More specifically, the vacuum distillation may be carried out under stepwise reduced pressure conditions from 760 Torr to 0.8 Torr.

According to another example, the polymerization raw material comprising recycled bis(2-hydroxyethyl) terephthalate may be prepared by further carrying out at least one of thin-film distillation under reduced pressure; and dissolution in water followed by adsorption-crystallization.

The thin-film distillation is a distillation method that makes a mixture to be separated into a thin film for increasing its surface area in contact with a heat source. Specifically, a mixture fed to the evaporator of the thin film evaporator forms a thin film on the inner wall of the thin film evaporator by the wiper rotor. Then, distillation is carried out under appropriate temperature conditions by heating. In addition, a condenser for recovering the evaporated material may be provided inside the thin film evaporator.

The thin film evaporation may be carried out by short path evaporation. Since such a short path and thin film evaporation has a short residence time and enables vacuum distillation using a high vacuum, it is possible to separate high-boiling or high-molecular-weight materials that are hardly separated by other distillation methods while minimizing the change of the reactants by heat. In addition, if the pressure inside a thin film evaporator is lowered, there is an advantage in that the vapor pressure of a material is reduced, which allows evaporation to take place at a lower temperature than its original boiling point.

As a specific example, the depolymerization product is fed to a short path and thin film evaporator, and a wiper for forming a thin film is rotated at 300 rpm or more. As a result, a vaporized material and a non-vaporized material can be separated from each other. The internal thin film temperature of the upper thin film evaporation apparatus during the thin film evaporation may be, for example, 150° C. to 250° C., 190° C. to 250° C., or 180° C. to 220° C. In addition, the internal pressure of the upper thin film evaporation apparatus during the thin film evaporation may be, for example, 0.005 Torr to 5.0 Torr, 0.05 Torr to 5.0 Torr, 0.05 Torr to 1.5 Torr, or 0.05 Torr to 1 Torr.

The adsorption-crystallization may be carried out by, for example, adding an adsorbent using water as a solvent, filtering, and crystallization.

Various solvents may be used for the adsorption-crystallization, but a solvent capable of dissolving bis(2-hydroxyethyl) terephthalate is preferably used as a solvent. As a specific example, in order to obtain the final reactant, water as a solvent is added to the polymerization raw material comprising recycled bis(2-hydroxyethyl) terephthalate, which is dissolved by heating, and an adsorbent is added thereto, followed by subjecting the solution obtained by filtration to crystallization and final filtration. As a result, a polymerization raw material with high purity can be obtained.

Water may be added in an amount of 100 parts by weight to 500 parts by weight, specifically, 200 parts by weight to 400 parts by weight, more specifically, 300 parts by weight to 350 parts by weight, relative to 100 parts by weight of the polymerization raw material.

In addition, the dissolution temperature may be 50° C. to 95° C., specifically, 60° C. to 85° C., more specifically, 70° C. to 75° C.

The adsorbent added may serve to adsorb and remove other foreign substances. It may be added in an amount of 0.1 part by weight to 3 parts by weight relative to 100 parts by weight of the polymerization raw material. The type and form of the adsorbent are not particularly limited. For example, activated carbon may be used.

MODE FOR THE INVENTION

Hereinafter, a preferred embodiment is presented for the understanding of the present invention. However, the following examples are provided only to help easily understand the present invention, and the scope of the present invention is not limited thereby.

Example 1

A first reactor made of stainless steel (SUS) was charged with 1,000 g of a waste polyester resin, 2,000 g of ethylene glycol, and 5.0 g of zinc acetate anhydride. The temperature inside the reactor was raised to 180° C., and depolymerization (first glycolysis reaction) was carried out for 2 hours. The reactant (first reactant) thus obtained was transferred to a second reactor and cooled to 150° C. 2,000 g of ethylene glycol was further added thereto, and depolymerization (second glycolysis reaction) was carried out for 2 hours while the reactor temperature was maintained at 150° C.

The reactant (second reactant) thus obtained was cooled to 120° C. through reduced pressure flash, and 16 g of a filter aid (Celite™ 545) was added thereto, followed by pressurized filtration to carry out solid-liquid separation. The separated liquid reactant was passed through a column filled with an ion-exchange resin (BC107(H) of Bonlite) to remove ionic impurities to obtain a mixture (third reactant) containing bis(2-hydroxyethyl) terephthalate and ethylene glycol.

The mixture (third reactant) was cooled to room temperature over 2 hours under stirring at 100 rpm in a 10-liter crystallizer equipped with a cooling water circulation jacket. The obtained crystallized product was separated into solid and liquid using a pressurized Nutsche filter (jacket type, filtration area 0.2 m$^2$) under a pressure of 3 bar to obtain a BHET cake (fourth reactant).

The BHET cake was transferred to a 10-liter distillation apparatus and heated to 130° C. again. Vacuum distillation was carried out under stepwise reduced pressure conditions from 760 Torr to 0.8 Torr to recover unreacted ethylene glycol. The reactant (fifth reactant) from which ethylene glycol had been removed was subjected to thin film evaporation at 220° C. and 0.08 Torr in a thin film evaporator (VKL70-4S of VTA) to obtain 1,040 g of a product from which dimers or higher oligomers had been removed. Thereafter, for adsorption-crystallization, 1,040 g of the above product and 3,120 g of distilled water were charged to a 10-liter glass reactor, dissolved at a temperature of 70° C., and then 5.2 g of activated carbon was added thereto, followed by stirring for 30 minutes and filtration thereof. The filtrate was cooled to room temperature for the crystallization thereof, filtered, and dried in a vacuum oven. As a result, 1,980 g of a polymerization raw material containing recycled bis(2-hydroxyethyl) terephthalate was obtained.

Example 2

The same procedure as in Example 1 was repeated to obtain a polymerization raw material comprising recycled bis(2-hydroxyethyl) terephthalate, except that the reaction time of the first glycolysis reaction was adjusted to 1 hour.

Example 3

The same procedure as in Example 1 was repeated to obtain a polymerization raw material comprising recycled bis(2-hydroxyethyl) terephthalate, except that the filtration was carried out using a filter press (filtration area 0.4 m², filtration plate 4 ea) under a pressure of 18 bar instead of a pressurized Nutsche filter.

Example 4

The same procedure as in Example 1 was repeated to obtain a polymerization raw material comprising recycled bis(2-hydroxyethyl) terephthalate, except that a waste polyester fiber was used as a waste polyester resin.

Example 5

The same procedure as in Example 1 was repeated to obtain a polymerization raw material comprising recycled bis(2-hydroxyethyl) terephthalate, except that the adsorption-crystallization was not carried out after the thin film distillation.

Comparative Example 1

The same procedure as in Example 1 was repeated to obtain a polymerization raw material comprising recycled bis(2-hydroxyethyl) terephthalate, except that the temperature in the first glycolysis reaction was adjusted to 210° C., and the temperature in the second glycolysis reaction was adjusted to 250° C.

Comparative Example 2

The same procedure as in Example 1 was repeated to obtain a polymerization raw material comprising recycled bis(2-hydroxyethyl) terephthalate, except that the cooling crystallization and pressurized Nutsche filter steps were omitted.

Test Example

The polymerization raw materials comprising recycled bis(2-hydroxyethyl) terephthalate of the Examples and Comparative Examples were each tested as follows.
(1) High-Performance Liquid Chromatography (HPLC)

About 0.01 g of each polymerization raw material comprising recycled bis(2-hydroxyethyl) terephthalate was diluted in about 20 ml of methanol, which was analyzed by high-performance liquid chromatography (HPLC) (model: Waters e2695, column: C18 (4.6×250 mm), 5 µm, UV detector: 242 nm, injection volume: 10 µl, eluent (gradient) A: $H_2O+H_3PO_4$, B: acetonitrile) Thereafter, the peak area fractions (%) of the following components among the total peak area of HPLC were obtained.
 MHET: monohydroxyethyl terephthalate
 BHET: bis(2-hydroxyethyl) terephthalate
 DEG-ester-1: 2-hydroxyethyl[2-(2-hydroxyethoxy)ethyl] terephthalate
 DEG-ester-2: bis[2-(2-hydroxyethoxy)ethyl]benzene-1,4-dicarboxylate
 HA-ester: 2-hydroxyethyl(2-acetoxyethyl) terephthalate
 Dimer: BHET dimer
 Trimer: BHET trimer
(2) Gas Chromatography (GC)

0.1 g of each polymerization raw material comprising recycled bis(2-hydroxyethyl) terephthalate was dissolved in 10 ml of $CHCl_3$, treated with a filter of 0.45 µm, and measured by GC.
 Model: Agilent 7890B
 Column: DB-624 (30 m×0.25 mm×1.4 µm)
 Oven Temp.: 60° C. (2 min.)—10° C./min.—200° C. (0 min.)—20° C./min.—260° C. (5 min.)
 Injector temp.: 250° C.
 Detector temp.: 250° C.
 Flow: 1.5 ml/min. ($N_2$), split ratio: 1/50
(3) TDI Each polymerization raw material comprising recycled bis(2-hydroxyethyl) terephthalate was subjected to HPLC analysis in the same manner as in section (1) above. The thermal property drop index (TDI) defined by the following equation was then calculated.

$$TDI = [DEG-ester-1] + [DEG-ester-2] \times 2 + \exp{^\wedge}[HA-ester]$$

Here, DEG-ester-1 was the peak area fraction (%) of 2-hydroxyethyl[2-(2-hydroxyethoxy)ethyl] terephthalate, DEG-ester-2 was the peak area fraction (%) of bis[2-(2-hydroxyethoxy)ethyl]benzene-1,4-dicarboxylate, and HA-ester was the peak area fraction (%) of 2-hydroxyethyl(2-acetoxyethyl) terephthalate. It was calculated by taking only the numerical values excluding the units of these parameters.
(4) Differential Scanning Calorimetry (DSC)

Each polymerization raw material comprising recycled bis(2-hydroxyethyl) terephthalate was measured for melting point (m.p.) with heating from 30° C. to 280° C. at a rate of 20° C./minute using a differential scanning calorimeter (DSC, TA Instruments Q20).
(5) Inductively Coupled Plasma Atomic Emission Spectroscopy (ICP-AES)

0.3 g of each polymerization raw material comprising recycled bis(2-hydroxyethyl) terephthalate was treated with ultrasonic waves and diluted with ultrapure water. The content (ppm) of inorganic substances was measured using ICP-AES (Model 5100 of Agilent) (detection limit of 5 ppm).
(6) Yellow Index (YID)

Each polymerization raw material comprising recycled bis(2-hydroxyethyl) terephthalate was dissolved in dimethylformamide at a concentration of 25% by weight at room temperature, and the yellow index was measured after 30 minutes. Transmission data were obtained with Illuminant D65 using Color Flex EZ of Hunterlab at an observer's angle of 2°. The yellow index (YID) value was calculated using a color analyzer in the software.

The results of the Test Examples are shown in the tables below.

TABLE 1

| | Info. | Ex. 1 | Ex. 2 | Ex. 3 | Ex. 4 | Ex. 5 | C. Ex. 1 | C. Ex. 2 |
|---|---|---|---|---|---|---|---|---|
| HPLC (%) | BHET | 98.20 | 98.10 | 98.51 | 97.22 | 96.21 | 90.04 | 91.20 |
| | MHET | 0.78 | 1.10 | 0.67 | 1.70 | 1.72 | 1.82 | 2.14 |
| | DEG-ester-1 | 0.41 | 0.32 | 0.22 | 0.44 | 0.80 | 5.20 | 1.85 |
| | DEG-ester-2 | 0.04 | 0.02 | 0.02 | 0.08 | 0.12 | 1.32 | 0.98 |
| | HA-ester | 0.20 | 0.21 | 0.11 | 0.23 | 0.41 | 0.33 | 1.12 |

TABLE 1-continued

|  | Info. | Ex. 1 | Ex. 2 | Ex. 3 | Ex. 4 | Ex. 5 | C. Ex. 1 | C. Ex. 2 |
|---|---|---|---|---|---|---|---|---|
|  | Dimer | 0.21 | 0.20 | 0.34 | 0.28 | 0.22 | 0.22 | 0.79 |
|  | Trimer | 0.01 | 0.00 | 0.00 | 0.01 | 0.05 | 0.90 | 0.70 |
|  | Others | 0.15 | 0.05 | 0.13 | 0.04 | 0.47 | 0.17 | 1.22 |
| GC (% by weight) | Residual EG | 0.10 | 0.10 | 0.10 | 0.10 | 0.20 | 0.22 | 0.23 |
| TDI |  | 1.71 | 1.59 | 1.38 | 1.86 | 2.55 | 9.23 | 6.87 |
| DSC (° C.) | m.p. | 112.2 | 111.9 | 112.3 | 112.5 | 111.7 | 109.2 | 107.6 |
| ICP-AES (ppm) | Zn | N.D. | N.D. | N.D. | N.D. | N.D. | N.D. | N.D. |
|  | Sb | N.D. | N.D. | N.D. | N.D. | N.D. | N.D. | N.D. |
|  | Fe | N.D. | N.D. | N.D. | N.D. | N.D. | N.D. | N.D. |
|  | P | N.D. | N.D. | N.D. | 6 | N.D. | N.D. | N.D. |
|  | Mn | N.D. | N.D. | N.D. | N.D. | N.D. | N.D. | N.D. |
|  | Mg | N.D. | N.D. | N.D. | N.D. | 5 | N.D. | 5 |
|  | Al | N.D. | N.D. | N.D. | N.D. | N.D. | N.D. | N.D. |
|  | Co | N.D. | N.D. | N.D. | N.D. | N.D. | N.D. | N.D. |
|  | Na | N.D. | N.D. | N.D. | N.D. | N.D. | N.D. | N.D. |
|  | K | N.D. | N.D. | N.D. | N.D. | N.D. | N.D. | N.D. |
| YID |  | 1.45 | 1.21 | 0.90 | 2.00 | 3.20 | 6.80 | 5.11 |

As can be seen from the above table, the polymerization raw materials comprising recycled BHET obtained in Examples 1 to 5 had an HPLC peak area fraction of diethylene glycol ester compounds (DEG-ester-1, DEG-ester-2) of 2.0% or less in total and an HPLC peak area fraction of acetate-based ester compound (HA-ester) of 1.0% or less in total, while they were excellent in contents of other impurities (MHET, dimer, trimer) or residual EG, melting point (m.p.), inorganic substances content, and yellow index (YID). In particular, the polymerization raw materials comprising recycled BHET obtained in Examples 1 to 5 had a thermal property drop index (TDI) of 3.0 or less. Thus, it is expected that the thermal resistance properties would be excellent in the polymerization of a recycled polyester resin therefrom.

In contrast, the polymerization raw materials comprising recycled BHET obtained in Comparative Examples 1 and 2 had an HPLC peak area fraction of diethylene glycol ester compounds (DEG-ester-1, DEG-ester-2) exceeding 2.0% in total and an HPLC peak area fraction of acetate-based ester compound (HA-ester) exceeding 1.0% in total, while they were poor in contents of other impurities (MHET, dimer, trimer) or residual EG, melting point (m.p.), inorganic substances content, and yellow index (YID). In particular, the polymerization raw materials comprising recycled BHET obtained in Comparative Examples 1 and 2 had a thermal property drop index (TDI) that reached 9.23 to the maximum. Thus, it is expected that the thermal resistance properties would be poor in the polymerization of a recycled polyester resin therefrom.

The invention claimed is:

1. A polymerization raw material, which is obtained by the depolymerization of waste polyester, wherein a peak area fraction of bis(2-hydroxyethyl) terephthalate is 95% or more, a peak area fraction of an acetate-based ester compound is 0.001% to 1.0% in total, and a peak area fraction of a diethylene glycol ester compound is 0.001% to 2.0% in total, as measured by high-performance liquid chromatography (HPLC), wherein the acetate-based ester compound is selected from the group consisting of 2-hydroxyethyl (2-acetoxyethyl) terephthalate (HAET), 2-acetoxyethyl[2-(2-hydroxyethoxy)ethyl] terephthalate, and 2-hydroxyethyl[2-[2-(2-hydroxyethoxy)ethoxy]ethyl] terephthalate, wherein the diethylene glycol ester compound is selected from the group consisting of 2-hydroxyethyl[2-(2-hydroxyethoxy)ethyl]terephthalate and bis[2-(2-hydroxyethoxy)ethyl]benzene-1,4-dicarboxylate, wherein the polymerization raw material has a yellow index (YID) of 5.0 or less, as measured for a solution dissolved in dimethylformamide at a concentration of 25% by weight, and wherein the polymerization raw material has a thermal property drop index (TDI) of 0.5 to 2.5, as defined by the following equation, as measured by high-performance liquid chromatography (HPLC):

$$TDI=[DEG\text{-}ester\text{-}1]+[DEG\text{-}ester\text{-}2]\times 2+\exp[HA\text{-}ester]$$

wherein DEG-ester-1 is a peak area fraction of 2-hydroxyethyl[2-(2-hydroxyethoxy)ethyl] terephthalate, DEG-ester-2 is a peak area fraction of bis[2-(2-hydroxyethoxy)ethyl]benzene-1,4-dicarboxylate, HA-ester is a peak area fraction of 2-hydroxyethyl(2-acetoxyethyl) terephthalate, and TDI is calculated by taking only numerical values of the peak area fractions.

2. The polymerization raw material of claim 1, wherein the polymerization raw material has a peak area fraction of oligomers of dimers or higher of 2.0% or less in total, as measured by high-performance liquid chromatography (HPLC).

3. The polymerization raw material of claim 1, wherein a content of residual ethylene glycol in the polymerization raw material is 0.5% by weight or less.

4. The polymerization raw material of claim 1, wherein the polymerization raw material has a melting point of 110° C. to 115° C.

5. A process for preparing the polymerization raw material of claim 1, which comprises:

(a) depolymerizing waste polyester by glycolysis to obtain a crude bis(2-hydroxyethyl) terephthalate solution, said crude bis(2-hydroxyethyl) terephthalate solution comprising the acetate-based compound and the diethylene glycol-based compound as by-products;

(b) cooling the crude bis(2-hydroxyethyl) terephthalate solution to crystallize it; and (c) separating the crystallized product into solid and liquid using a pressurized filter, wherein the depolymerization in step (a) comprises:

(1) subjecting the waste polyester to depolymerization by a first glycolysis reaction at a temperature of 180° C. to 200° C. to obtain a first reactant; and (2) subjecting the first reactant to depolymerization by a second glycolysis reaction at a temperature of 150° C. to 170° C. to obtain a second reactant.

6. The process of claim 5, wherein the pressurized filter in step (c) is a Nutsche filter or a filter press.

7. The process of claim 5, wherein the acetate-based compound and the diethylene glycol-based compound are removed through the pressurized filter in step (c) so that a peak area fraction of the acetate-based ester compound is 0.001% to 1.0% in total, and a peak area fraction of the diethylene glycol ester compound is 0.001% to 2.0% in total, as measured by high-performance liquid chromatography (HPLC).

8. The process of claim 5, wherein the polymerization raw material is prepared by further carrying out a step of removing an unreacted glycol by distillation.

9. The process of claim 5, wherein the polymerization raw material is prepared by further carrying out at least one of thin-film distillation under reduced pressure; and dissolution in water followed by adsorption-crystallization.

\* \* \* \* \*